US012061987B2

United States Patent
Zhang et al.

(10) Patent No.: US 12,061,987 B2
(45) Date of Patent: Aug. 13, 2024

(54) INTERPRETABLE NEURAL NETWORK

(71) Applicant: Microsoft Technology Licensing, LLC, Redmond, WA (US)

(72) Inventors: Cheng Zhang, Cambridge (GB); Yordan Kirilov Zaykov, Cambridge (GB); Yingzhen Li, Cambridge (GB); Jose Miguel Hernandez Lobato, Cambridge (GB); Anna-Lena Popkes, Cambridge (GB); Hiske Catharina Overweg, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 1065 days.

(21) Appl. No.: 16/459,596

(22) Filed: Jul. 1, 2019

(65) Prior Publication Data
US 2020/0349441 A1 Nov. 5, 2020

(30) Foreign Application Priority Data
May 3, 2019 (GB) ...................................... 1906234

(51) Int. Cl.
*G06N 3/084* (2023.01)
*G06N 3/047* (2023.01)

(52) U.S. Cl.
CPC ............ *G06N 3/084* (2013.01); *G06N 3/047* (2023.01)

(58) Field of Classification Search
CPC .............................. G06N 3/0472; G06N 3/084
See application file for complete search history.

(56) References Cited

U.S. PATENT DOCUMENTS

2020/0334599 A1* 10/2020 Zayats .................... G06N 3/047

OTHER PUBLICATIONS

Blundell et al., Weight Uncertainty in Neural Networks, May 2015. (Year: 2015).*
Neal, Radford, Bayesian Learning for Neural Networks, Lecture Notes in Statistics, 1996. (Year: 1996).*
Jylanki et al., Expectation Propagation for Neural Networks with Sparsity-Promoting Priors, Journal of Machine Learning Research 15 (2014), pp. 1849-1901, May 2014. (Year: 2014).*

(Continued)

*Primary Examiner* — Marshall L Werner
(74) *Attorney, Agent, or Firm* — Barta Jones, PLLC

(57) ABSTRACT

A method of operating a neural network, comprising: at each input node of an input layer, weighting a respective input element received by that node by applying a first class of probability distribution, thereby generating a respective set of output parameters describing an output probability distribution; and from each input node, outputting the respective set of output parameters to one or more nodes in a next, hidden layer of the network, thereby propagating the respective set of output parameters through the hidden layers to an output layer; the propagating comprising, at one or more nodes of at least one hidden layer, combining the sets of input parameters and weighting the combination by applying a second class of probability distribution, thereby generating a respective set of output parameters describing an output probability distribution, wherein the first class of probability distribution is more sparsity inducing than the second class of probability distribution.

20 Claims, 5 Drawing Sheets

(56) References Cited

OTHER PUBLICATIONS

Ghosh et al., Structured Variational Learning of Bayesian Neural Networks with Horseshoe Priors, Jul. 2018. (Year: 2018).*
Shidhar et al, A Comprehensive Guide to Bayesian Convolutional Neural Network with Variational Inference, Jan. 2019. (Year: 2019).*
Beal, Matihew James, "Variational Algorithms for Approximate Bayesian Inference", A Thesis Submitted for the Degree of Doctor of Philosophy of the University of London, May 2003, 281 Pages.
Betancourt, et al., "Hamiltonian Monte Carlo for hierarchical models", In Current trends in Bayesian methodology with applications, 11 Pages.
Bhadra, et al., "Lasso meets horseshoe", In repository of arXiv:1706.10179, 2017, 32 Pages.
Bishop, Christopher M., "Pattern Recognition and Machine Learning", Published in book Springer, 2007, pp. 137-152.
Blundell, et al., "Weight uncertainty in neural networks", In Repository of arXiv:1505.05424, 2015, 10 Pages.
Bojarski, et al., "End to end learning for self-driving cars", In Repository of arXiv:1604.07316, 2016, 9 Pages.
Boulanger-Lewandowski, et al., "Modeling temporal dependencies in highdimensional sequences: Application to polyphonic music generation and transcription", In Repository of arXiv:1206.6392, 2012, 8 Pages.
Bouton, et al., "Restoring cortical control of functional movement in a human with quadriplegia", Published in Journal Nature, 533(7602), p. 247., 13 Pages.
Caballero, et al., "Dynamically modeling patient's health state from electronic medical records: A time series approach", In Proceedings of the 21st ACM SIGKDD International Conference on Knowledge Discovery and Data Mining, Aug. 10, 2015.
Carbonetto, et al., "Scalable variational inference for Bayesian variable selection in regression, and its accuracy in genetic association studies", Published in Bayesian analysis. 2012,7(1):73-108., 2012, 33 Pages.
Caruana, et al., "Intelligible Models for HealthCare: Predicting Pneumonia Risk and Hospital 30-day Readmission", In Proceedings of 21st ACM SIGKDD International Conference on Knowledge Discovery and Data Mining, Aug. 10, 2015, pp. 1721-1730.
Carvalho, et al., "Handling sparsity via the horseshoe", Published in Artificial Intelligence and Statistics, 2009, pp. 73-80.
Celi, et al., "A database-driven decision support system: customized mortality prediction", Published in Journal of personalized medicine 2(4), 2012, pp. 138-148.
Che, et al., "Recurrent neural networks for multivariate time series with missing values.", Published in Scientific Reports, 8(1):6085, 2018, 12 Pages.
Chen, et al., "Disease prediction by machine learning over big data from healthcare communities", Published in Journal IEEE Access, vol. 5, 2017, pp. 8869-8879.
Choi, et al., "Gram: graph-based attention model for healthcare representation learning", In Proceedings of the 23rd ACM SIGKDD International Conference on Knowledge Discovery and Data Mining, Aug. 13, 2017, pp. 787-795.
Churpek, et al., "Multicenter comparison of machine learning methods and conventional regression for predicting clinical deterioration on the wards", Published in Journal Critical care medicine, 44(2), 2016, 15 Pages.
Collobert, et al., "Natural Language Processing (Almost) from Scratch", In Journal of Machine Learning Research, vol. 12, Aug. 2011, pp. 2493-2537.
Desautels, et al., "Prediction of sepsis in the intensive care unit with minimal electronic health record data: a machine learning approach", Published in JMIR medical informatics, 4(3), 2016, 15 Pages.
Elixhauser, et al., "Comorbidity measures for use with administrative data", Published in Journal Medical care, 1998, pp. 8-27.
Gall, et al., "A new simplified acute physiology score (SAPS II) based on a european/north american multicenter study", Published in Jama 270, No. 24, 1993, pp. 2957-2963.

Ghassemi, Marzyeh, et al., "Unfolding physiological state: Mortality modelling in intensive care units.", In Proceedings of the 20th ACM SIGKDD international conference on Knowledge discovery and data mining., Aug. 24, 2014, pp. 75-84.
Ghosh, et al., "Model selection in Bayesian neural networks via horseshoe priors", In Repository of arXiv:1705.10388, 2017, 15 Pages.
Goodfellow, et al., "Deep Learning", In Publication of MIT Press, Nov. 18, 2016, pp. 351-354.
Hamesse, et al., "Simultaneous measurement imputation and outcome prediction for Achilles tendon rupture rehabilitation", In Repository of arXiv:1810.03435, 2018, 12 Pages.
Harutyunyan, et al., "Multitask Learning and Benchmarking with Clinical Time Series Data", In repository of arXiv, arXiv:1703.07771, Mar. 22, 2017, 19 Pages.
Hernandez-Lobato, et al., "A probabilistic model for dirty multitask feature selection", In Proceedings of the 32nd International Conference on Machine Learning, Jul. 6, 2015, 10 Pages.
Hernandez-Lobato, et al., "Expectation propagation in linear regression models with spike-and-slab priors", Published In Journal Machine Learning, vol. 99, No. 3, Jun. 2015, pp. 437-487.
Hernandez-Lobato, et al., "Probabilistic backpropagation for scalable learning of Bayesian neural networks", In Proceedings of the 32nd International Conference on Machine Learning, Jul. 6, 2015, 9 Pages.
Hinton, et al., "Keeping the neural networks simple by minimizing the description length of the weights", In Proceedings of the sixth annual conference on Computational learning theory, Jul. 26, 1993, 9 Pages.
Ingraham, et al., "Bayesian sparsity for intractable distributions", In Repository of arXiv:1602.03807, 2016, 10 Pages.
Ishwaran, et al., "Spike and slab variable selection: frequentist and Bayesian strategies", Published in Journal The Annals of Statistics 33, No. 2 (2005), 2005, pp. 730-773.
Johnson, et al., "MIMIC-III, a Freely Accessible Critical Care Database", Published in Scientific Data, vol. 3, Article No. 160035, May 24, 2016, 9 Pages.
Jordan, et al., "An introduction to variational methods for graphical models", In Journal of Machine Learning, vol. 37, Issue 2, Nov. 1999, pp. 183-233.
Joshi, et al., "Prognostic physiology: modeling patient severity in intensive care units using radial domain folding", In Proceedings of American Medical Informatics Association Annual Symposium, Nov. 3, 2012, pp. 1276-1283.
Kingma, et al., "Adam: A method for stochastic optimization", In Repository of arXiv preprint arXiv:1412.6980, Dec. 22, 2014, pp. 1-15.
Kingma, et al., "Auto-encoding variational bayes", In Repository of arXiv preprint arXiv:1312.6114, Dec. 20, 2013, pp. 1-14.
Knaus, et al., "APACHE II: a severity of disease classi?cation system", Published in Journal Critical Care Medicine, vol. 13, Issue 10, 1985, pp. 818-829.
Kurniati, et al., "Process mining in oncology using the MIMIC-III dataset", Published in Journal of Physics: Conference Series, 2018, 10 Pages.
Lemeshow, et al., "Mortality probability models based on an international cohort of intensive care unit patients", Published in Jama, 270(20), 1993, pp. 2478-2486.
Yoon, et al., "Deep sensing: Active sensing using multi-directional recurrent neural networks", In Proceedings of 6th International Conference on Learning Representations, ICLR, 2018, 19 Pages.
Louizos, et al., "Bayesian compression for deep learning", In Proceedings of Annual Conference on Neural Information Processing Systems 2017, Dec. 4, 2017, 11 Pages.
Ma, et al., "Eddi: Efficient dynamic discovery of high-value information with partial VAE", In Repository of arXiv:1809.11142, 2018, 22 Pages.
Maas, et al., "Collaborative european neurotrauma effectiveness research in traumatic brain injury (center-tbi) a prospective longitudinal observational study", Published in Journal Neurosurgery, vol. 76, No. 1, 2014, pp. 67-80.

(56) References Cited

OTHER PUBLICATIONS

MacKay, et al., "A practical Bayesian framework for backpropagation networks", Published in Journal Neural Computation, vol. 4, No. 3, 1992, pp. 448-472.

MacKay, et al., "Bayesian nonlinear modeling for the prediction competition", Published in ASHRAE transactions, 100 (2), 1994, 16 Pages.

Malsiner-Walli, et al., "Comparing spike and slab priors for Bayesian variable selection", In Repository of arXiv:1812.07259, 2018, 23 Pages.

Meiring, et al., "Optimal intensive care outcome prediction over time using machine learning", Published in PLoS One, 13(11):e0206862, 2018, 19 Pages.

Mitchell, et al., "Bayesian variable selection in linear regression", Published in Journal of the American Statistical Association, 83(404), 1988, pp. 1023-1032.

Nair, et al., "Rectified linear units improve restricted Boltzmann machines", In Proceedings of the 27th international conference on machine learning (ICML10), 2010, 8 Pages.

Ghosh, et al., "Assumed Density Filtering Methods for Learning Bayesian Neural Networks", In Proceedings of the 30th AAAI Conference on Artificial Intelligence, Feb. 12, 2016, pp. 1589-1595.

Ghosh, et al., "Structured Variational Learning of Bayesian Neural Networks with Horseshoe Priors", In Proceedings of the 35th International Conference on Machine Learning, Jul. 31, 2018, 14 Pages.

Hernandez-Lobato, et al., "Generalized Spike-and-Slab Priors for Bayesian Group Feature Selection using Expectation Propagation", In Journal of Machine Learning Research, vol. 14, Jan. 1, 2013, pp. 1891-1945.

Jylanki, et al., "Expectation Propagation for Neural Networks with Sparsity-Promoting Priors", In Journal of Machine Learning Research, vol. 15, Jan. 1, 2014, pp. 1849-1901.

"International Search Report and Written Opinion Issued in PCT Application No. PCT/US20/023231", Mailed Date: Jul. 2, 2020, 13 Pages.

Little, et al., "Statistical Analysis with Missing Data", Published by John Wiley & Sons, 2019, 464 Pages.

Nemati, et al., "An interpretable machine learning model for accurate prediction of sepsis in the ICU", Published in Journal Critical care medicine, 46(4), 2018, 14 Pages.

Park, et al., "The Bayesian lasso", Published in Journal of the American Statistical Association, 103(482), 2008, pp. 681-686.

Ranganath, et al., "Black box variational inference", In Proceedings of the Seventeenth International Conference on Artificial Intelligence and Statistics, 2014, pp. 814-822.

Rezende, et al., "Stochastic backpropagation and approximate inference in deep generative models", In Proceedings of the 31st International Conference on Machine Learning, Jun. 21, 2014, 14 Pages.

Rumelhart, et al., "Learning Representations by Back-Propagating Errors", Published in Journal Nature, vol. 323, Oct. 9, 1986, pp. 533-536.

Scheipl, et al., "Spike-and-slab priors for function selection in structured additive regression models", Published in Journal of the American Statistical Association 107, No. 500, 2012, pp. 1518-1532.

Shipp, et al., "Diffuse large b-cell lymphoma outcome prediction by gene-expression profiling and supervised machine learning", Published in Journal Nature medicine 8(1), 2002, 67 Pages.

Silver, et al., "Mastering the game of go with deep neural networks and tree search", Published in Journal of Nature, vol. 529, Jan. 28, 2016, pp. 484-489.

Steyerberg, et al., "Predicting Outcome after Traumatic Brain Injury: Development and International Validation of Prognostic Scores Based on Admission Characteristics", Published In Journal of PLoS Medicine, vol. 5, Issue 8, e165, Aug. 5, 2008, pp. 1251-1261.

Tan, et al., "Ensemble machine learning on gene expression data for cancer classification", In Proceedings of New Zealand Bioinformatics Conference, Te Papa, Wellington, New Zealand, Feb. 13, 2003, 10 Pages.

Tibshirani, Robert, "Regression shrinkage and selection via the lasso", Published in Journal of the Royal Statistical Society: Series B (Statistical Methodology), 1996, 23 Pages.

Vranas, et al., "Identifying distinct subgroups of ICU patients: A machine learning approach", Published in Journal Critical Care Medicine 45(10), 2017, pp. 1607-1615.

* cited by examiner

INTERPRETABLE NEURAL NETWORK

BACKGROUND

Neural networks are used in the field of machine learning and artificial intelligence. A neural networks comprises layers of nodes which are interconnected by links and which interact with each other. The neural network can take input data and propagate the input data through the layers of the network to generate output data. Certain nodes within the network perform operations on the data, and the result of those operations is passed to other nodes, and so on.

FIG. 1 shows an extremely simplified version of an example neural network. The example neural network comprises an input layer of nodes, a hidden layer of nodes and an output layer of nodes. In practice, there will be many nodes in each layer, and there may also be more than one layer per section. Each node of the input layer is capable of generating data (e.g. a value or parameter) at its output by carrying out a function on the data provided to that node. Each node in the input layer is connected at least initially to each node in the first hidden layer adjacent to the input layer. Like the nodes of the input layer, each node in the hidden layer is capable of generating data at its output by carrying out a function on the data provided to that node from a previous layer. The first hidden layer may be connected to a second hidden layer. Alternatively, there may be a single hidden layer which is connected to the output layer. The data generated by the final hidden layer is supplied to the node(s) in the output layer. Nodes of the output layer may also perform an operation on the data which they receive.

At some or all of the nodes of the network, the data input to that node is weighted by a respective weight. A weight may define the connectivity between a node in a given layer and the nodes in the next layer of the neural network. The weights can be just numerical data or a distribution. When the weights are defined by a distribution, the neural network can be fully probabilistic and captures the uncertainty. The network learns by operating on data input at the input layer, and adjusting the operations (e.g. the weighting and/or function) performed by some or all of the nodes on the data input to those node. Each node is also associated with a certain value or distribution. This value of the node or the distribution of the value of the node indicate whether the node is active or not. If the value is close to zero, the node is not active. There are different learning approaches, but in each case there is a forward propagation through the network from left to right in FIG. 1, a calculation of an overall error, and a backward propagation from right to left in FIG. 1 through the network of the error. In the next cycle, each node takes into account the back propagated error and produces a revised set of weights. In this way, the network can be trained to perform its desired operation.

SUMMARY

Neural networks, e.g. artificial neural networks (ANNs) are powerful machine learning models that have been successful in several highly complex real-word tasks. The non-linearity of ANNs allows them to capture complex nonlinear dependencies, a quality which often results in high predictive performance. Despite widespread success, predictions from ANNs lack interpretability. Instead, they often function as a black box. For example, after training an ANN on the task of outcome prediction it is difficult to determine which input data (i.e. features) are relevant for making predictions. As a consequence, the application of ANNs in practice has been limited.

One particular domain in which the interpretability of neural networks is critical is healthcare. A neural network may be trained to predict, for example, a patient's risk of death or disease, how long a patient has left to live (e.g. after a traumatic head injury or a cancer diagnosis) or will remain in hospital, whether the patient requires a particular surgery or the chances of it being successful, etc. However, it is highly undesirable in the medical domain to make potentially life-changing decisions without being able to clearly justify those decisions. In contrast, it would be desirable to inform a doctor, patient or next-of-kin which factors (e.g. heart rate, blood pressure, etc.) contributed to a prediction. Moreover, knowing which factors are relevant for predicting an outcome would enable a medical practitioner to focus on collecting that data (e.g. particular measurements of the patient) whilst disregarding irrelevant factors. Other domains include sales analysis, education applications etc, where the decision-making process needs to be interpretable.

According to one aspect disclosed herein, there is provided a computer-implemented method of operating a neural network. The neural network comprises a plurality of layers, the plurality of layers comprising: i) an input layer comprising a plurality of input nodes each configured to receive a respective one of a plurality of input elements, ii) one or more hidden layers each comprising a plurality of hidden nodes, each hidden node configured to receive sets of input parameters where each set describes an input probability distribution from one of the nodes in a previous layer of the network, and to output a set of output parameters describing an output probability distribution to a next layer of the network, and iii) an output layer comprising one or more output nodes each configured to output a respective output element, wherein the one or more hidden layers connect the input layer to the output layer. The method comprises: at each of the input nodes, weighting the respective one of the plurality of input elements received by that input node by applying an instance of a first class of probability distribution to that input element, thereby generating a respective set of output parameters describing an output probability distribution. The method further comprises, from each of the input nodes, outputting the respective set of output parameters as input parameters to one or more nodes in a next, hidden layer of the network, and thereby propagating the respective set of output parameters through the one or more hidden layers to the output layer. The propagating of the respective set of output parameters comprises, at each of one or more nodes of at least one of the hidden layers, combining the sets of input parameters and weighting the combination by applying an instance of a second class of probability distribution to that combined set of input parameters, thereby generating a respective set of output parameters describing an output probability distribution for outputting to a next layer of the network. The first class of probability distribution is more sparsity inducing than the second class of probability distribution.

Each class of probability distribution may consist of one or more possible forms of distribution. Each instance applied at each node takes the form of one of the distributions in its respective class. Each form of probability distribution in the first class is more sparsity inducing than each form of probability distribution in the second class, at least in that the first class of probability distributions introduce more sparsity amongst the set of output parameters generated at each of the input nodes compared to if the second class of probability distribution was used instead of the first class. "Sparsity" and "sparsity inducing" are terms of art referring to the tendency of a distribution, when applied as a weighting in the nodes of a neural network, to drive the output of lesser-contributing nodes toward zero. A sparsity inducing probability distribution will tend to result in smaller values getting smaller (i.e. driven towards zero), whilst allowing larger values to remain large. In other words, a more sparsity inducing distribution gives more "decisive" outputs (closer to binary). It is understood in the art that some probability distributions are more sparsity inducing than others.

In general, only Bayesian neural networks have distributions associated to the weights of the network. However conventionally only a single, common form of distribution would be chosen across all nodes of the neural network. The disclosed network on the other hand uses a mixture of a sparsity inducing distribution in the input layer and a non-sparsity inducing distribution in the hidden layers.

An advantage of this neural network design disclosed herein is that it provides interpretable predictions in terms of which features (the input elements) are important for prediction. The weighting defines the connectivity between a node in a given layer and the nodes in the next layer of the neural network. For instance, said applying of the instance of the first class of probability distribution may comprise applying one or more weight values sampled from that instance. For instance, each input element may be multiplied by one or more of the sampled weight values. The generated set of output parameters (e.g. a mean and variance) are transmitted from an input node to a node in the first hidden layer and describe a distribution which is associated with the input element which that input node receives. The first class of probability distribution drives one or more distribution parameters (e.g. the mean) of some distributions towards zero, whilst allowing one or more distribution parameters of some distributions to remain (relatively) large. This has the effect that a given input element will either contribute to later layers of the network, therefore contributing to the output layer (e.g. the prediction), or make zero or insignificant contribution to later layers of the network. Inspecting the model parameters (i.e. the generated set of output parameters) directly shows which input elements are considered relevant for prediction and which are considered irrelevant. The first class of probability distribution is defined to encourage the weights to be zero or to be values that are (relatively) far from zero.

Each class of probability distribution may comprise one or more possible forms of distribution. Each form of the first class of probability distribution is more sparsity inducing than each form of the second class of probability distribution, at least in that the first class of probability distribution introduces more sparsity amongst the set of output parameters generated at each of the input nodes compared to if the set of output parameters was generated at the input nodes by applying the second class of probability distribution.

So if, each output distribution of each node in the input layer has a centre point (e.g. a mean value), the first class of probability distribution is more sparsity inducing in that it tends to drive those centre points toward zero more than if the second class of probability distribution was applied by the input nodes to the same input elements. E.g. a threshold may be applied to classify whether the centre point is a zero value or a non-zero value, and the first class of probability distribution results in more of those centre points being classified as zero values.

According to a second aspect disclosed herein, there is provided computing apparatus comprising one or more processors and storage storing code arranged to run on the one or more processors, wherein the code is configured so as when run to perform operations according to any embodiment disclosed herein.

According to a third aspect disclosed herein, there is provided a corresponding computer program product for performing any of the operations according to any embodiment disclosed herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made, by way of example only, to the accompanying drawings in which.

DETAILED DESCRIPTION OF EMBODIMENTS

A machine learning algorithm comprises a model (e.g. neural net) which maps an input or input vector (set of inputs) to an output or output vector (set of outputs). It also comprises a training algorithm (e.g. a feedback algorithm such as a back-propagation algorithm in the case of a neural net). The training algorithm trains the mapping of the model (at least in a supervised approach) based on training data comprising i) multiple example values of the input vector, and ii) the corresponding experienced values of the output(s) that resulted from those training inputs. Based on this data, the training algorithm can adapt the mapping of the input(s) to the output(s) in its model so that the mapped outputs of the model will tend towards matching the experienced outputs in the training data. This model can then be used to subsequently infer (i.e. predict) a value of the output(s) for any given value of the input(s).

As mentioned above, it would be desirable to be able to determine which input(s) are relevant for predicting the output(s). Embodiments of the present invention involve the use of an interpretable neural network which enable the inputs in predicting one or more outputs to be identified.

Figure 2:
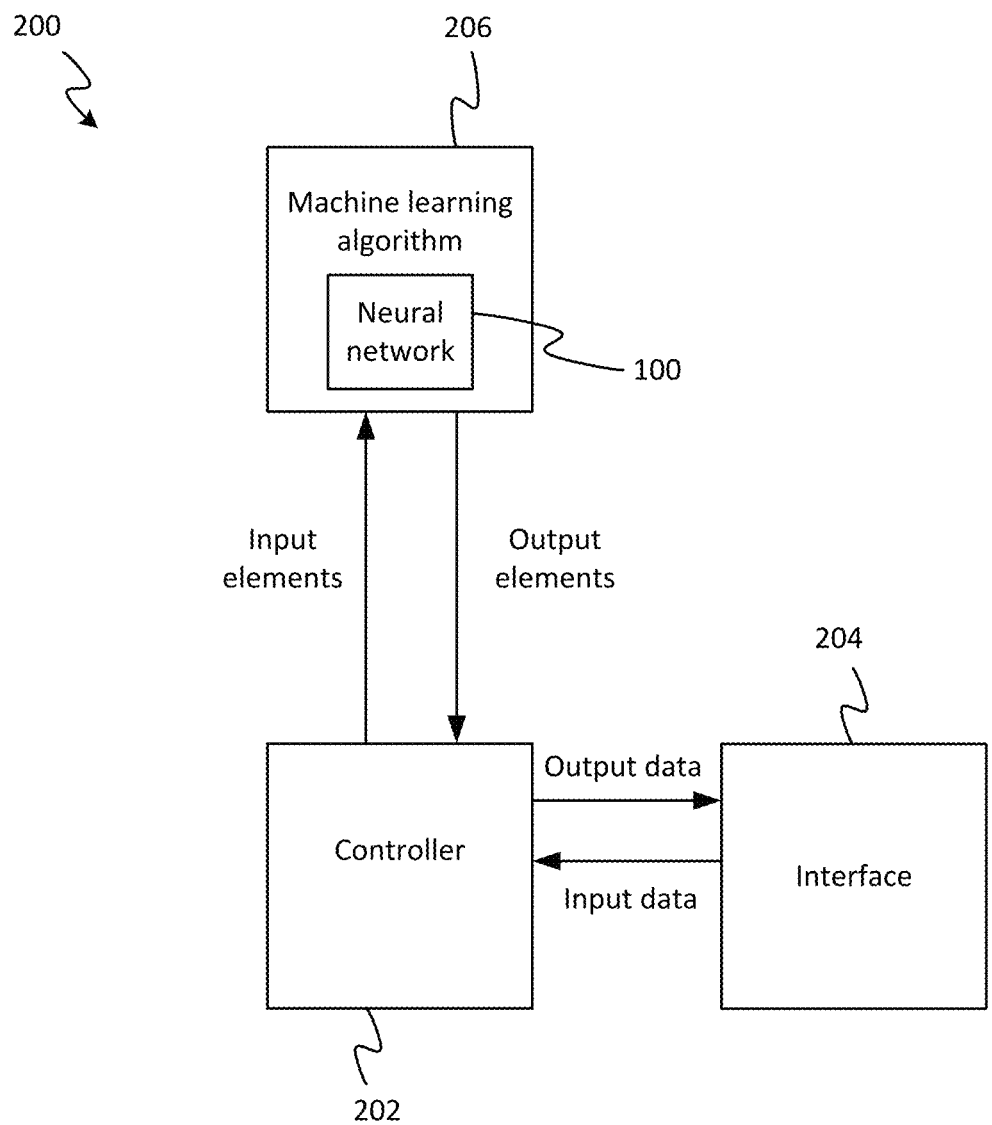
FIG. 2 is a schematic illustration of a computing apparatus for operating a neural network.

FIG. 2 illustrates an example computing apparatus 200 configured to operate the neural network 100 in accordance with embodiments described herein. The computing apparatus 200 may take the form of a user terminal such as a desktop computer, laptop computer, tablet, smartphone, wearable smart device (e.g. smart watch), etc. Additionally or alternatively, the computing apparatus 200 may comprise a server. A server herein refers to a logical entity which may comprises one or more physical server units located at one or more geographic sites. Where required, distributed or "cloud" computing techniques are in themselves known in the art. The one or more user terminals and the server may be connected to a packet-switched network, which may comprise for example a wide-area internetwork such as the Internet, a mobile cellular network such as a 3GPP network, a wired local area network (LAN) such as an Ethernet network, or a wireless LAN such as a Wi-Fi, Thread or 6LoWPAN network.

The computing apparatus 200 comprises at least a controller 202, an interface (e.g. a user interface) 204, and a machine learning algorithm 206 which runs the neural network 100. The controller 202 is operatively coupled to each of the interface 204 and the machine learning algorithm 206.

Each of the controller 202, interface 204, and machine learning algorithm 206 may be implemented in the form of software code embodied on computer readable storage and run on processing apparatus comprising one or more processors such as CPUs, work accelerator co-processors or application specific processors implemented on one or more computer terminals or units at one or more geographic sites. The storage on which the code is stored may comprise one or more memory devices employing one or more memory media (e.g. electronic or magnetic media), again implemented on one or more computer terminals or units at one or more geographic sites. In embodiments, one, some or all of said components of the computing apparatus 200 may be implemented on the server. Alternatively, a respective instance of one, some or all of these components may be implemented in part or even wholly on each of one, some or all of the user terminals. In further examples, the functionality of the above-mentioned components may be split between any combination of the user terminals and the server. Again it is noted that, where required, distributed computing techniques are in themselves known in the art. It is also not excluded that one or more of these components may be implemented in dedicated hardware.

The controller 202 comprises a control function for coordinating the functionality of the interface 204 and the machine learning algorithm 206. The interface refers to the functionality for receiving and/or outputting data, e.g. to and/or from one or more users. The interface 204 may additionally or alternatively receive and output data to a different component of the computing apparatus and/or to a different device. E.g. the interface may comprise a wired or wireless interface for communicating, via a wired or wireless connection respectively, with an external device. The interface 204 may comprise one or more constituent types of interface, such as voice interface, and/or a graphical user interface. The interface 204 may be presented to the user(s) through one or more I/O modules on their respective user device(s), e.g. speaker and microphone, touch screen, etc., depending on the type of user interface. The logic of the interface may be implemented on a server and output to the user through the I/O module(s) on his/her user device(s). Alternatively some or all of the logic of the interface 204 may also be implemented on the user device(s) 102 its/themselves.

Figure 1:
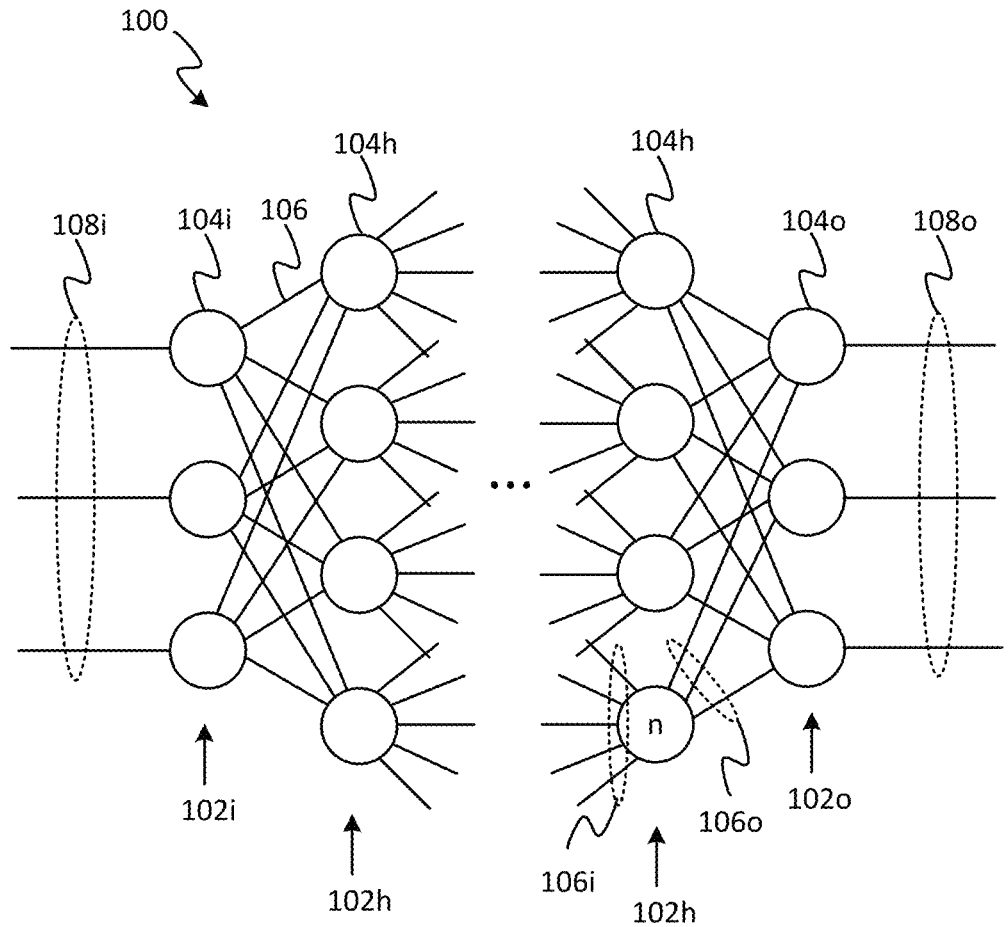
FIG. 1 is a schematic illustration of an example neural network

The controller 202 is configured to control the machine learning algorithm 206 to perform operations in accordance with the embodiments described herein. The machine learning algorithm comprises the neural network 100. As shown in FIG. 1, the neural network 100 comprises a plurality of layers, each layer comprises one or more nodes. The neural network comprises an input layer 102$i$ comprising one or more input nodes 104$i$, one or more hidden layers 102$h$ (also referred to as inner layers) each comprising one or more hidden nodes 104$h$ (or inner nodes), and an output layer 102$o$ comprising one or more output nodes 104$o$. For simplicity, only two hidden layers 102$h$ are shown in FIG. 1. However in general there may be many more hidden layers. The input nodes 104$i$ of the input layer 102$i$ are each connected to one or more hidden nodes 104$h$ in a first hidden layer following the input layer 102$i$. Preferably each input node 104$i$ is connected to each hidden node 104$h$ in the first hidden layer. If examples where there is only a single hidden layer, one, some or all of the hidden nodes of the first hidden layer are connected to one, some, or all of the one or more output nodes of the output layer 102$o$. Preferably each hidden node 104$h$ in this example is connected to each output node 104$o$. If, as shown in FIG. 1, there may be a plurality of hidden layers, the plurality of hidden layers comprising at least a first hidden layer and a final hidden layer. The input layer 102$i$ is connected to the first hidden layer and the final hidden layer is connected to the output layer 102$o$. The plurality of hidden layers may comprise one or more middle hidden layers connecting the first hidden layer to the final hidden layer. Preferably, each hidden node 104$h$ of each hidden layer 102$h$ is connected to each node of the preceding and following layer which, depending on the hidden layer's position in the network, may be the input layer 102$i$, another hidden layer 102$h$, or the output layer 102$o$. However, it is not excluded that some nodes of a given layer are not connected to all of the nodes of a preceding or following layer.

The connections 106 between each node in the network are sometimes referred to as links or edges. Depending on the position of the node in the network, a given node may have one or more input connections and one or more output connections, with the exception of the input nodes 104$o$ and output nodes 104$o$ which only have output connections and input connections respectively. For example, the node labelled "n" in FIG. 1 has five incoming connections 106$i$ and three outgoing connections 106$o$. In the special case of the input nodes 104$i$, each input node is configured to receive a respective one of a plurality of input elements 108$i$. The input elements may be, for example, a scalar value, a vector, a distribution, etc. Each input element may be the same type of element (e.g. they may all be a number) or some or all input elements may be of a different type. In the special case of the output nodes, each output node is configured to receive a respective output element. The output elements 108$o$ may be, for example, a scalar value, a vector, a distribution, etc. Each output element may be the same type of element (e.g. they may all be vectors) or some or all input elements may be of a different type. Each hidden node 104$h$ is configured to receive a set of parameters from a previous layer of the network via its input connections and output a set of parameters to a next layer of the network via its output connections. As will be described in more detail later, each set of parameters describes a respective distribution. For instance, the parameters may be a centre point and width of the distribution.

Each node represents a function of its input connections, the outputs of the function being the output connections of the node, such that the outputs of a node depend on the inputs according to the respective function. The function of each node is parametrized by one or more respective parameters, sometimes also referred to as weights (not necessarily weights in the sense of multiplicative weights, though that is one possibility). Thus the relation between the input(s) and output(s) of each node depends on the respective function of the node and its respective parameters.

During operation of the neural network 100, each input node 104i receives a respective one of the input elements 108i. For instance, the input elements 108i may be supplied to the input nodes 104i as part of a training phase or a prediction phase. In some examples, a user may provide the input elements 108i via the user interface 204, with the controller 202 then supplying the input elements 108i to the input nodes 104i of the neural network 100. Upon receiving one of the input elements 108i, a given input node 104i weights that input element by applying a first class of probability distribution to that input element. Each input node 104i may apply a same one of the first class of probability distributions. Alternatively, some or all of the input nodes 104i may apply a different one of the first class of probability distributions. The application of the first class of probability distribution to the input element generates a set of distribution parameters. The set of distribution parameters parameterize (i.e. describe) a distribution. The set of distribution parameters may comprise, for example, a centre-point (e.g. mean) of the distribution, a width of the distribution (e.g. a variance or standard deviation), etc. Each respective set of parameters generated by a respective input node 104i will, in general, describe a different distribution due to the different input elements 108i. In the following disclosure, reference to "a distribution" or "distributions" should be taken to mean "a probability distribution" or "probability distributions".

After generating a respective set of parameters, each node transmits its respective set of distribution parameters to the first hidden layer 102h. Each node in the first hidden layer 102h that receives one or more respective set of parameters applies a weighting to a combination of those sets of parameters before transmitting them to the nodes of the next hidden layer 102h (if there are more than one hidden layer 102h) or directly to the node(s) of output layer 102o (if there is a single hidden layer). Either way, the set respective sets of parameters are propagated through the hidden layer(s) of the neural network 100 to the output layer. A weighting may also be applied by the output node(s). Each node in the hidden layer(s) and output layer may receive multiple respective sets of parameters via its multiple incoming connections, each set parameterizing a respective distribution. Each of those nodes may combine the respective sets of parameters before applying its weighting. Alternatively, each of those nodes may apply its weighting before combing the respective sets of parameters that result from a given weighting.

Upon receiving a set of parameters via an incoming connection (referred to hereinafter as an incoming set of parameters, or a set of input parameters), at least one node in at least one hidden layer 102h weights that set of incoming parameters (after combining that set with one or more incoming sets of parameters) by applying a second class of probability distribution to the combined set of incoming parameters. The application of the second class of probability distribution to a set of parameters generates a new set of distribution parameters (referred to hereinafter as an outgoing set of parameters or a set of outgoing parameters). The outgoing set of parameters parameterize (i.e. describe) a new distribution. Each node that generates an outgoing set of parameters transmits that set to one or more nodes in a following layer. The at least one layer may be, for example, the first hidden layer 102h (i.e. the hidden layer 102h immediately following the input layer 102i).

Figure 4:
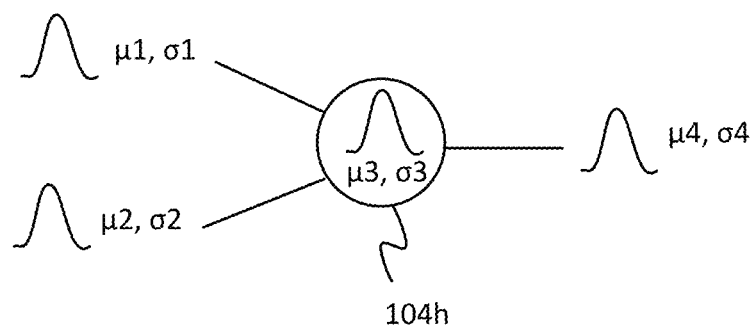
FIG. 4 is a schematic operation of a node of the network, using a Gaussian distribution (second class of prior) as an example

FIG. 4 illustrates an example operation of a node of the network. In this example, the node receives two respective sets of parameters, each set having two parameters. The parameters describe a respective distribution. For instance, the two parameters may be a mean and standard deviation. In FIG. 4, one distribution is described by the parameters µ1 and σ1, and the other distribution is described by the parameters µ2 and σ2. The node combines the two respective sets of parameters (e.g. via a multiplication, a convolution or some other mathematical operation) and weights the resulting combination by applying a form of either the first or second class of probability distribution (e.g. a Gaussian distribution). The Gaussian distribution is also parametrised by a respective set of parameters, which are µ3 and σ3 in FIG. 4. The result of the weighting is a further set of parameters (µ4 and σ4) describing a further distribution. The node in this example may be a hidden node or an output node. An input node performs a similar operation except that it receives an input element (which may be a scalar instead of a set of parameters describing a distribution).

The first class of probability distribution is more sparsity inducing than the second class of probability distribution. That is, the first class of probability distribution induces more sparsity amongst the set of distribution parameters generated at each of the input nodes 104 i compared to the set of distribution parameters generated by the application of the second class of probability distribution at the at least one node of the at least one hidden layer 102 h. This has the effect that some of the respective sets of distribution parameters are shrunk, i.e. there is a high probability that the centre-point of the distribution is zero or very close to zero. This selective shrinkage of the inputs results in some of the input elements 108 i not contributing to the output(s) of the neural network 100, or at least not making a significant contribution to the output(s) of the neural network 100.

The first class of probability distribution may be, for example, a horseshoe probability distribution, a spike-and-slab probability distribution, a Laplace distribution, or a t-distribution. Each node that applies a first class of distribution may apply the same or a different distribution. E.g. each node in a given layer may apply the same distribution, but different layers may apply different distributions. Preferably, each node which applies the first class of probability distribution applies a horseshoe probability distribution. The first class of probability distribution may be at least more sparsity inducing than a Gaussian distribution.

Figure 3:
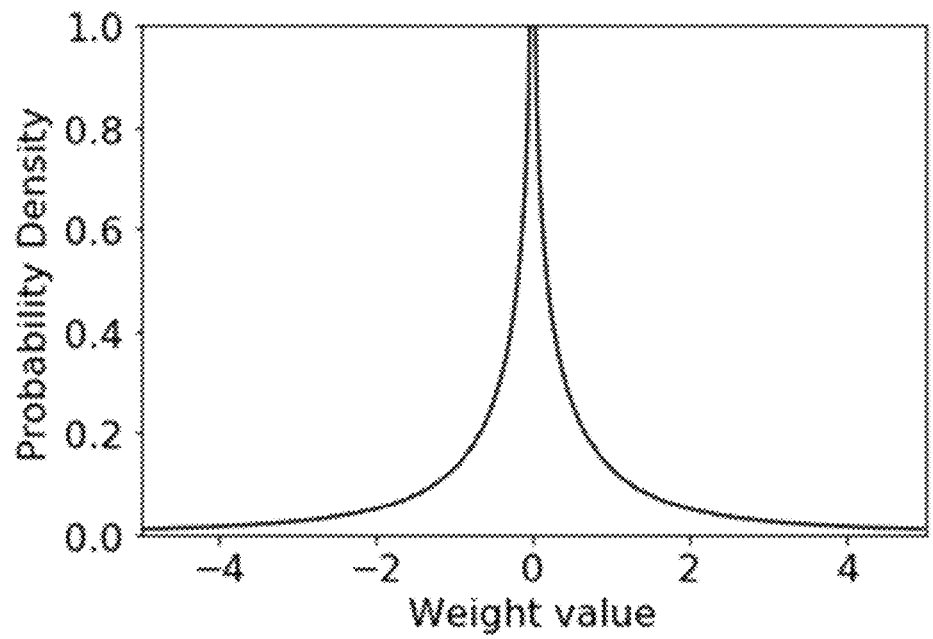
FIG. 3 is an example of a horseshoe distribution, which can be used as the sparsity inducing prior for the first layer weights

FIG. 3 illustrates an example of a first class of probability distribution. This example shows a horseshoe probability distribution. As shown, the horseshoe distribution is characterised by there being a very high probability of the weight value being zero, with a lower probability that the weight value is non-zero.

The second class of probability distribution may be, for example, a Gaussian distribution. Each node that applies a second class of distribution may apply the same or a different distribution. E.g. each node in a given layer may apply the same distribution, but different layers may apply different distributions. Preferably, each node which applies the second class of probability distribution applies a Gaussian probability distribution.

Preferably, each node of the at least one hidden layer 102h weights its incoming set of parameters by applying a second class of probability distribution. Each node of the at least one hidden layer 102h may apply a same one of the second class of probability distributions. Alternatively, some or all of the nodes of the at least one hidden layer 102h may apply a different one of the first class of probability distributions.

As mentioned above, the neural network 100 may comprise a plurality of hidden layers. In that case, one, some or all of the hidden nodes of at least two hidden layers weight its respective incoming set of parameters by applying a second class of probability distribution. Each hidden node (e.g. in the same layer) may apply the same class of second distribution. Alternatively, one or more nodes in the same layer, or one or more nodes in a different layer may apply a different class of second distribution. For instance, the hidden nodes in the first hidden layer may apply a different class of second distribution compared to the hidden nodes in the next hidden layer 102h, or the final hidden layer.

When the neural network 100 comprises a plurality of hidden layers, each node of at least one hidden layer 102 h may weight a respective incoming set of parameters by applying a first class of probability distribution to that incoming set of parameters. That is, not only do the nodes of the input layer 102 i apply a first class of probability distribution, so does at least one of the hidden layers, e.g. the first hidden layer. In this case, at least one node in one other hidden layer may weight a respective incoming set of parameters by applying a second class of probability distribution to that incoming set of parameters. A node may either apply a first class of probability distribution or a second class of probability distribution, but not both. Alternatively, a node may not apply any probability distribution, or a node may apply a distribution that does not belong to either of the first or second class of distributions.

In one example, only the first hidden layer is a hidden layer 102h which comprises nodes which apply the first class of probability distribution.

Figure 5:
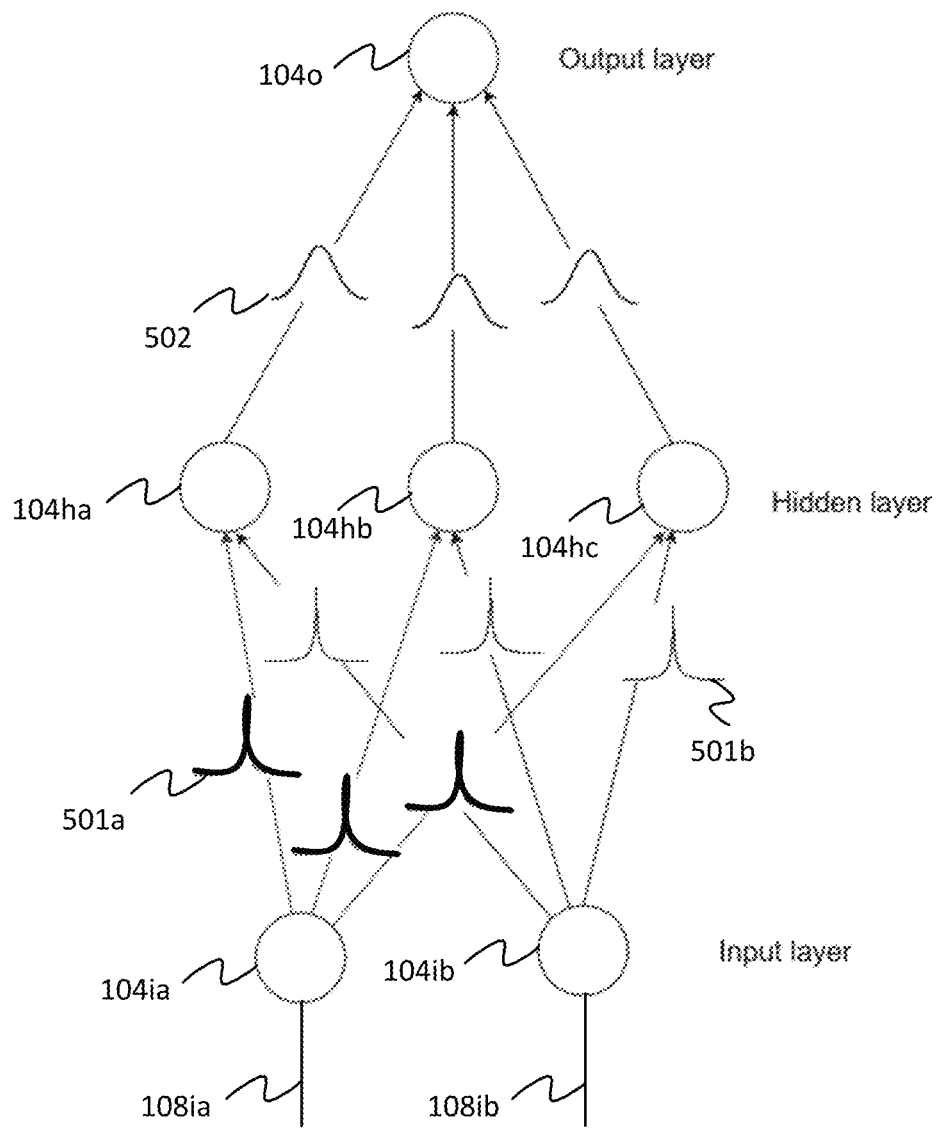
FIG. 5 is another schematic illustration of an example neural network, and FIGS. 6a and 6b each show sets of distribution parameters connected to the different input elements.

FIG. 5 illustrates an example arrangement of the neural network 100. In this example the neural network comprises an input layer 102i comprising two input nodes, a single hidden layer 102h comprising three hidden nodes, and an output layer comprising one output node 104o. Each input node 104i receives a respective input element. Each input node 104i weights its received input element by applying a first class of probability distribution 501 (a horseshoe distribution in this example). For example, said applying may comprise applying, to an input element, one or more weight values sampled from the instance of the first class of distribution. Here, applying may comprise multiplying the input element by the one or more weight values. This is known as sampling from a distribution. Alternatively, said applying may comprise applying an analytical function, characterised by the instance of the first class of probability distribution, to the input element. E.g. the input element may be input to a function of the parameters describing said instance of the first class of probability distribution. The input nodes 104i may apply the same first class or a different first class of probability distribution. The weighting generates a respective set of parameters parameterizing a respective distribution. FIG. 5 shows the shape of the respective distributions parameterised by the parameters. These respective sets of parameters are passed to each hidden node of the hidden layer 102h. Therefore each hidden node receives two incoming sets of parameters, each set describing a distribution of the shape shown in FIG. 5. Each hidden node then combines the incoming sets of parameters and weights the result by applying a weight value (or multiple weight values) drawn from a second class of probability distribution 502 (a Gaussian distribution in this example). The hidden nodes may apply a weight value from the same second class or a different second class of probability distribution. The weighting generates a respective set of parameters parameterizing a respective distribution. FIG. 5 shows the shape of the respective distributions parameterised by the parameters. These respective sets of parameters are passed to the output node 104o of the output layer 102o. Each set of parameters may be output as an output element. Alternatively, the sets of parameters may be combined (and optionally weighted) before being output as an output element.

The prior distributions (i.e. the instances of the first class of probability distribution) of the input layer's weights are tied such that the same instance of the first class of probability distribution is shared amongst all weights connected to the same input element. I.e. the connections between a given input node and one or more nodes of a first hidden layer are weighted by the same instance of the first probability distribution. As shown in FIG. 5, input 104 ia (which receive input element 108 ia) is connected to hidden nodes 104 ha, 104 hb and 104 hc via three separate connections. Similarly, input node 104 ib (which receive input element 108 ib) is connected to the same hidden nodes 104 ha, 104 hb and 104 hc via three separate connections. The connections between input node 104 ia and the hidden nodes are each weighted by the same instance 501 a of the first class of probability distribution (shown by a thick distribution curve). Similarly, the connections between input node 104 ib and the hidden nodes are each weighted by the same instance 501 b of the first class of probability distribution (shown by a thin distribution curve). Therefore input node 104 ia is tied to the hidden nodes via a same instance (e.g. a first instance) of the first class of probability distribution, and input node 104 ib is tied to the hidden nodes via a same instance (e.g. a second instance) of the first class of probability distribution. This allows certain input elements to be selected (e.g. because the output parameters transmitted from 104 ia to 104 h are far from zero) whilst others can be ignored (e.g. because the output parameters transmitted from 104 ia to 104 h are close to zero).

Before being used in an actual application the neural network 100 is first operated in a training phase in which it is trained for that application. Training comprises inputting training data to the input nodes 104 i of the network and then tuning the weighting applied by some or all of the nodes based on feedback from the output(s) of the network. The training data may comprises multiple different input elements 108 i, each comprising a value or vector of values corresponding to a particular input node 104 i of the network (e.g. a height node, a weight node, etc.). With each training data element, resulting output(s) at the output nodes of the network are generated, and feedback is used to gradually tune the weighting applied by the nodes so that, over many cycles, the output(s) of the network are as close as possible to the actual observed value(s) in the training data across the training inputs (for some measure of overall error). I.e. with each piece of input training data, the predetermined training output is compared with the actual observed output of the network. This comparison provides the feedback which, over many pieces of training data, is used to gradually tune the weighting applied by the various nodes in the network toward a state whereby the actual output of the graph will closely match the desired or expected output for a given input vector. Examples of such feedback techniques include stochastic back-propagation.

The adjustment of the weighting applied by a given node may comprise adjusting one or more parameters parameterizing the applied distribution (i.e. the first or second class of distribution). For instance, the first class of distribution applied by each input node 104i may initially be parameterized by the same parameters. After one or more training cycles, the first class of distribution applied by one or more of the input node 104*i* may now be parameterized by different parameters (i.e. the values of the parameters have changed). Similarly, the parameters of the second class of distribution applied by each node which applies said distribution may be adjusted during training of the neural network 100.

Once trained, the neural network 100 may be operated in a prediction phase (also known as an inference phase) in which it can be used to predict (or infer) the output element(s), e.g. an output value or vector, for a given set of input elements 108*i*. That is, a set of input elements 108*i* for which the output elements are unknown are supplied to the input nodes. The input nodes 104*i* weight the input elements 108*i* according to the embodiments described above (i.e. the application of the first class of probability distribution) and then propagate the resulting sets of parameters through the hidden layer(s) to the output layers. As discussed, some or all of the sets of parameters are subject to weighting by some or all of the hidden nodes of the network according to the embodiments described above (e.g. the application of the second class of probability distribution). The weighting applied by the nodes of the network during the prediction phase is the weighting refined during the training phase. That is, the respective probability distributions applied by each node are parameterized by the respective distribution parameters learnt during the training phase.

As stated, the prediction generates a set of output elements (i.e. predictions) for a given set of input elements 108 *i*. The predictions may be output to a user via an interface (e.g. display screen) of the computing apparatus. Additionally or alternatively, the predictions may be output to a different function of the computing apparatus and/or to a different device. For instance, the predictions may be recorded in a database (e.g. a medical record for a patient whose data is the input elements 108 *i*).

The sets of distribution parameters generated at each of the input nodes 104*i* can be used to determine which input elements 108*i* are important for predicting the output. Due to the properties of the first class of probability distributions (i.e. the sparsity inducing prior distributions), some of the respective sets of distribution parameters generated at each input node 104*i* will not contribute to the output elements as they are propagated through the hidden layers. As an example, if a first class of probability distribution, when applied to a first input element, produces a first set of distribution parameters comprising an average value of zero, that zero value cannot contribute to the nodes of the first hidden layer or any further layer. Put another way, if all of the incoming sets of parameters are summed at a node of the first hidden layer, the zero value of the first set of distribution parameters will not make a difference to the output elements generated by applying a first or second class of probability distribution to the incoming sets of parameters. Therefore the respective sets of distribution parameters generated at each input node 104*i* may be output to interpret the neural network 100, i.e. to see which input elements 108*i* matter for predicting the output(s).

For instance, for each input element, the respective set of distribution parameters generated by applying one of the first class of probability distributions to that input element may be output (e.g. displayed on a display screen) together with that input element. This would allow a user to infer which input elements 108*i* are relevant for prediction and which are not relevant. For instance, if the input element is associated with a set of distribution parameters centred on a value of zero, the user can determine that that particular input element does not contribute to the output element(s). The input elements 108*i* may be, for example, those received by the input nodes 104*i* during the training phase or the prediction phase.

In some embodiments, the respective sets of distribution parameters generated at each input node 104*i* may comprise a centre point (e.g. mean) of the distribution. The centre point may be output, e.g. to a user. Alternatively, the controller may cause a decision to be output to the user based on the centre point. An input element associated with a non-zero centre point may be interpreted as contributing to the output elements, and vice versa for a zero centre point. Therefore if an input element is associated with a non-zero centre point, a decision may be output indicating that the input element is relevant for prediction, and if an input element is associated with a zero centre point, a decision may be output indicating that the input element is not relevant for prediction. Thus a binary decision is made—an input element is said to either contribute or not contribute. In some examples, the input element may have a non-zero centre point but its centre point may be less than a threshold value (which may be, for example, determined by a user). If the centre point is less than the threshold it is interpreted as a zero value and the controller outputs a decision indicating that the associated input element does not contribute to predicting the output(s).

Additionally or alternatively, the respective sets of distribution parameters generated at each input node 104*i* may comprise a width (e.g. standard deviation or variance) of the distribution. The width of the distribution may be interpreted as the confidence in whether an associated input element contributes to the output element(s). That is, the width indicates the confidence in the binary decision.

As well as, or instead of, outputting the respective sets of distribution parameters generated by the input nodes, the respective input elements 108*i* associated with the respective sets of distribution parameters may be disregarded during a later operation of the neural network 100 (i.e. not fed into or used by the neural network 100). For instance, if an input element is determined not to be relevant for predicting the output element(s) (e.g. because the associated distribution is parameterized by a zero mean), that input element may be prevented from being propagated through the network, e.g. not supplied to the input layer 102*i*.

After training the neural network 100 some input elements 108*i* may be determined to be irrelevant for prediction of a set of output elements. Therefore when operating in the prediction phase for predicting that same set of output elements, those input elements 108*i* are no longer required. Removing the input elements 108*i* from the neural network 100 saves on computational resources as less (mathematical) operations are required. Since that input element is determined to be irrelevant for prediction, the input element does not need to be gathered, e.g. if the input element is a measurement of the patient, that measurement does not need to be collected. This can, for example, reduce the amount of time spent by a medical practitioner monitoring or obtaining measurements from the patient. Moreover, if an input element is removed, any node that would have operated on that input element (or parameters stemming from that input element) no longer has to operate on that input element.

The following describes an example arrangement of the neural network which may be trained to make medical predictions.

Intensive care unit (ICU) clinicians are faced with a large variety of data types including EHRs, monitoring data and diagnostic data. The heterogeneity and volume of this data, along with short timescales over which clinical changes can occur, makes the ICU setting a good test case for using neural networks to model many prediction problems in healthcare. Most approaches based on static features model only linear relationships or rely on manual feature engineering. Manual feature engineering scales poorly, and prevents models from automatically discovering patterns in the data. Linear models are easy to interpret, because the importance of input features can directly be inferred from the magnitude of the associated model coefficients. This is appealing for transparent clinical decision making and highly desirable for real-world applications for two reasons. Firstly, decisions without a justification are unacceptable both medico-legally and to clinicians and patients. Secondly, interpretability allows the model to be queried to gain novel insights into data which may be biologically hypothesis-generating. However, the capacity of linear models is limited. In most real world problems the relationship between input features and target values is non-linear or may involve complex interactions between predictors. Consequently, more powerful approaches are needed to model such data well. The following describes a model for mortality prediction named HorseshoeBNN. The model is able to both capture non-linear relationships and learn which input features are important for prediction, thereby making the model interpretable.

Bayesian Neural Networks

Given an observed dataset $D=\{(x_n|y_n)\}_{n=1}^{N}$, it is desirable to determine a model $y=f(x)$ that fits the data well and generalizes to unseen cases. In the context of an example mortality prediction task described below, the vector $x_n$ (i.e. the input elements) comprises different medical measurements and $y_n$ is a binary indicator of the outcome for a specific patient. In parametric modelling a popular model for such tasks is the artificial neural network (ANN), which defines highly non-linear functions by stacking multiple layers of simple non-linear transformations. As an example, a fully connected ANN with L hidden layers denes the function $y=f(x)$ in the following way:

$$h^{(0)}=x, \quad h^{(l)}=a(W^{(l)}h^{(l-1)}), \quad l=1, \ldots, L,$$
$$y=a'(W^{(L+1)}h^{(L)})$$
Equation 1:

Here a(•) represents an activation function which is usually a simple non-linear transformation, e.g. sigmoid or ReLU. Depending on the task, the non-linearity a'(•) for the output layer may be an identity function for regression, or a sigmoid/softmax function for binary/multiclass classification. Bias terms can also be included in each layer by defining $h^{(l)}=[h^{(l)},1]$. The following function, $\varphi=\{W^{(l)}\}_{l=1}^{L+1}$, is used to represent all parameters of an ANN, and the function defined by Equation (1) is denoted as $y=f(x; \varphi)$ to emphasize the dependence of the function values on $\varphi$.

Instead of directly predicting the response y with a deterministic function $f$, Bayesian neural networks (BNNs) start from a probabilistic description of the modelling task, and estimate the uncertainty of the parameters given the data. Concretely, the network parameters $\varphi$ are considered random variables, and a prior distribution $p(\varphi)$ is selected to represent the prior belief of their configuration. Assuming that the observed data is independent and identically distributed (i.i.d.), the likelihood function of $\varphi$ is defined as:

$$p(D|\varphi)=\Pi_{n=1}^{N} P(y_n|x_n,\varphi)$$
Equation 2:

where, in case of a binary classification task like the one presented below, the label $y_n$ is a scalar, and $$\log p(y_n|x_n,\varphi)=y_n \log(f(x_n);\varphi)+(1-y_n)lof(1-f(x_n;\varphi))$$
Equation 3:

For regression tasks, $p(y_n|x_n, \varphi)=N(y_n; f(x_n;\varphi),\sigma^2 I)$. After observing the training data D, a posterior distribution of the network weights $\varphi$ is defined by Bayes' rule $$p(\varphi | D) = \frac{p(\varphi)p(D|\varphi)}{p(D)}, \quad p(D) = \int p(\varphi)p(D|\varphi)d\varphi$$
Equation 4

This posterior distribution represents the updated belief of how likely the network parameters are given the observations. With the posterior distribution one can predict the response y* of an unseen input x* using the predictive distribution:

$$p(y^*|x^*,D)=\int p(y^*|x^*\varphi)p(\varphi|D)d\varphi$$
Equation 5:

The HorseshoeBNN: Feature Selection with Sparsity Inducing Priors

When the first class of probability distribution is a horseshoe distribution, the neural network is referred to as a HorseshoeBNN for convenience. The prior distribution $p(\varphi)$ captures the prior belief about which model parameters (i.e. which input elements) are likely to generate the target outputs y (i.e. the output elements), before observing any data. When focusing on feature selection, sparsity inducing priors are of particular interest. In the following, a horseshoe prior is used, which in its simplest form can be described as:

$$w|\tau \sim N(0,\tau^2) \text{ where } \tau \sim C^+(0,b_0)$$
Equation 6:

where $C^+$ is the half-Cauchy distribution and $\tau$ is a scale parameter. The probability density function of the horseshoe prior with $b_0=1$ is illustrated in FIG. 3. It has a sharp peak around zero and wide tails. This encourages shrinkage of weights that do not contribute to prediction, while at the same time allowing large weights to remain large. For feature selection a horseshoe prior may be used for the first layer (the input layer) of a BNN by using a shared half-Cauchy distribution to control the shrinkage of weights connected to the same input feature. Specifically, denoting $W_{ij}^{(1)}$ as the weight connecting the j-th component of the input vector x to the i-th node in the first hidden layer, the associated horseshoe prior is given by $$W_{ij}^{(1)}|\tau_n, v \sim N(0,\tau_j^2 v^2) \text{ where } \tau_j \sim C^+(0,b_0) \text{ and }$$
$$v \sim C^+(0,b_g)$$
Equation 7:

The layer-wide scale v tends to shrink all weights in a layer, whereas the local shrinkage parameter $\tau_j$ allows for reduced shrinkage of all weights related to a specific input feature $x_j$. As a consequence, certain features of the input vector x are selected whereas others are ignored. For the bias node a Gaussian prior distribution may be used. The prior of the weights in the second layer of the HorseshoeBNN (e.g. the first hidden layer) is modelled by a Gaussian distribution, which prevents overfitting. An example network architecture is given in FIG. 4. Although the examples described a BNN with a single hidden layer, the model can easily be enlarged by adding more hidden layers, e.g. with Gaussian priors.

A direct parameterization of the half-Cauchy prior can lead to instabilities in variational inference for BNNs. Therefore, the horseshoe prior may be reparametrized using auxiliary parameters:

$$a \sim C^+(0, b) \Leftrightarrow a | K \sim Inv\Gamma\left(\frac{1}{2}, \frac{1}{\kappa}\right); \kappa \sim Inv\Gamma\left(\frac{1}{2}, \frac{1}{b^2}\right)$$
Equation 8

After adding the auxiliary variables to the Horseshoe prior, the prior over all the unobserved random variables $\theta=\{\{W^{(l)}\}_{l=1}^{L+1}, v, \vartheta, \tau=\{\tau_j\}, \lambda=\{\lambda_k\}\}$ is $$p(\theta) = p(W^{(1)}, v, \vartheta, \tau, \lambda) \prod_{n=2}^{(L+1)} p(W^{(l)}),$$

$$p(W^{(l)}) = \Pi_{ij} N(W_{ij}^{(l)}; 0, \sigma^2), l = 2, \ldots, L+1$$

$$p(W^{(1)}, v, \vartheta, \tau, \lambda) = p(v \mid \vartheta) p(\vartheta) \Pi_j p(\tau_j \mid \lambda_j) p(\lambda_j) \Pi_i p(N(W_{ij}^{(1)}; 0, \tau_j^2 v^2)$$

$$p(\tau_j \mid \lambda_j) = Inv\Gamma\left(\frac{1}{2}, \frac{1}{\lambda_j}\right),\ p(\lambda_j) = Inv\Gamma\left(\frac{1}{2}, \frac{1}{b_0^2}\right),$$

$$p(v \mid \vartheta) = Inv\Gamma\left(\frac{1}{2}, \frac{1}{\vartheta}\right),\ p(\vartheta) = Inv\Gamma\left(\frac{1}{2}, \frac{1}{b_g^2}\right)$$

Scalable Variational Inference for HorseshoeBNN

For most BNN architectures both the posterior distribution $p(\theta|D)$ and the predictive distribution $p(y^*|x^*, D)$ are intractable due to a lack of analytic forms for the integrals. To address this outstanding issue a simpler distribution $q_\phi(\theta) \approx p(\theta|D)$ may be defined and $p(\theta|D)$ may later be replaced with $q_\phi(\theta)$ in prediction. More specifically, $$q_\phi(\theta) = q_\phi(W^{(1)}|\tau, v) q_\phi(v) q_\phi(\vartheta) q_\phi(\tau) q_\phi(\lambda) \Pi_{l=1}^{L+1} q_\phi(W^{(l)})$$

Equation 9:

and using factorized Gaussian distributions for the weights in upper layers gives:

$$q(W^{(l)}) = \prod_{ij} N\left(W_{ij}^{(l)} \mid \mu_{W_{ij}^{(l)}}, \sigma^2_{W_{ij}^{(l)}}\right), l = 2, \ldots, L+1$$

To ensure non-negativity of the shrinkage parameters, a log-normal approximation to the posterior of v and $\tau_j$ may be used, i.e.

$$q_\phi(v)=N(\log v; \mu_v, \sigma_v^2),\ q_\phi(\tau_j)=N(\log \tau_j; \mu_{\tau_j}, \sigma_{\tau_j}^2)$$

Equation 10:

In the horseshoe prior (see Eq. 6) the weights $W_{ij}$ and the scales $\tau_j$ and v are strongly correlated. This leads to strong correlations in the posterior distribution with pathological geometries that are hard to approximate. This problem may be mitigated by reparametrizing the weights in the horseshoe layer as follows:

$$\beta_{ij} \sim N(\beta_{ij}|\mu_{\beta ij}, \sigma_{v\beta ij}^2),\ W_{ij}^{(1)} = \tau_1 v \beta_{ij}$$

Equation 11:

and equivalently, parametrizing the approximate distribution $q(W^{(1)}|v, \tau)$ as $$q(W^{(1)}|v, \tau) = \Pi_{ij} q(W_{ij}^{(1)}|v, \tau_j) = \Pi_{ij} N(W_{ij}^{(1)}; v \tau_k \mu_{\beta ij}, v^2 \tau_j^2 \sigma_{\beta ij}^2)$$

Equation 12:

Because the log-likelihood term $p(y|x, \theta)$ does not depend on $\vartheta$ or $\lambda$, it can be shown that the optimal approximations $q(\vartheta)$ and $q(\lambda)$ are inverse Gamma distributions with distributional parameters dependent on $q(\theta\backslash\vartheta,\lambda)$. The variational posterior $q_\phi(\theta)$ may be fitted by minimizing the Kullback-Leibler (KL) divergence $KL[q_\phi(\theta)\|p(\theta|D)]$. It can be shown that the KL divergence minimization task is equivalent to maximizing the evidence lower-bound (ELBO)

$$\mathcal{L}(\phi) = \mathbb{E}_{q_\phi(\theta)}[\log p(D|\theta)] - KL[q_\phi(\theta)\|p(\theta)] = \mathbb{E}_{q_\phi(\theta)}[\log p(D)] - KL[q(\theta|\phi)\|p(\theta|D)]$$

Equation 13:

Since the ELBO still lacks an analytic form due to the non-linearity of the BNN, a black box variational inference may be applied to compute an unbiased estimate of the ELBO by sampling $\theta \sim q_\phi(\theta)$. More specifically, because the q distribution may be constructed by a product of (log-)normal distributions, the reparametrization trick may be applied to draw samples from the variational distribution: $w \sim N(w; \sigma^2) \leftrightarrow \in \sim N(\in; 0,1), w = \mu + \sigma \in$. Furthermore, stochastic optimization techniques may be employed to allow for mini-batch training, which enables the variational inference algorithm to scale to large datasets. Combining both, the doubly stochastic approximation to the ELBO is $$\mathcal{L}(\phi) = \frac{N}{M} \sum_{m=1}^{M} \log p(y_m \mid x_m, \theta) - KL[q_\phi(\theta)\|p(\theta)],$$

$$\theta \sim q_\phi(\theta),\ \{(x_m, y_m)\}_{m=1}^{M} \sim D^M$$

which is used as the loss function for the stochastic gradient ascent training of the variational parameters $\phi$.

Interpretable Results

Figure 6A:
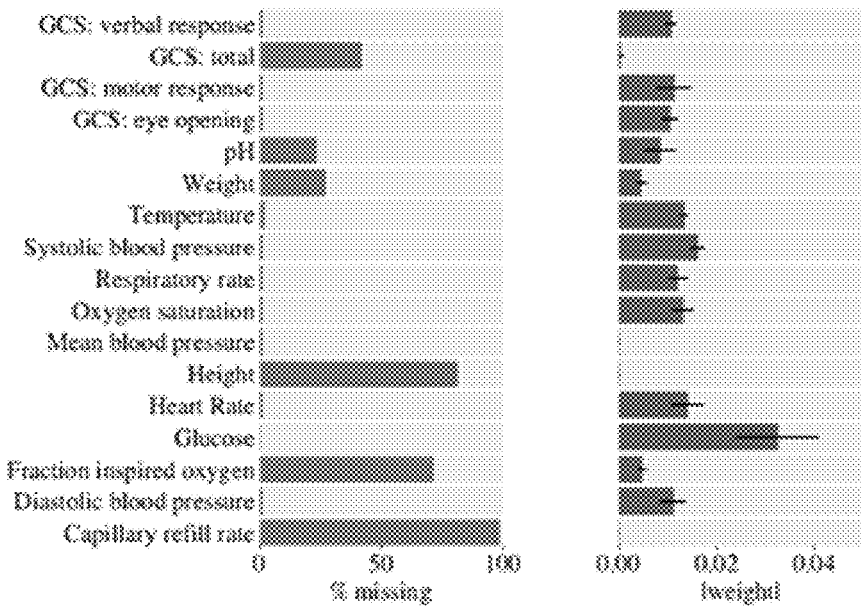
Figure 6B:
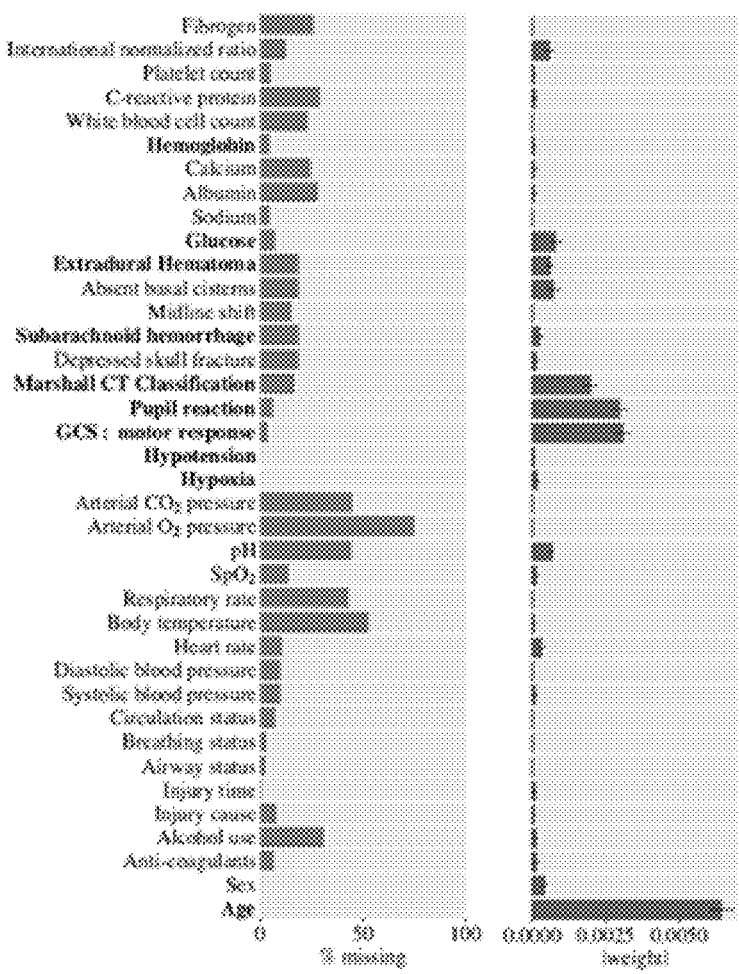

Results of training the HorseshoeBNN with medical training data are shown in FIGS. 6a and 6b. In the HorseshoeBNN each input feature is associated with a vector of 50 distributions (the number of hidden units). The average of the mean value of these distributions is plotted in the right panel of each of FIGS. 6a and 6b. The left column of each figure shows the percentage of missing data for the features in the training data. The right column of each figure shows the norm of the weights of the HorseshoeBNN. The name of each input feature is given on the far left of the plots. Feature weights of zero indicate that the corresponding features are irrelevant for outcome prediction. All non-zero weights indicate that the corresponding features are relevant for predicting mortality.

It will be appreciated that the above embodiments have been described by way of example only.

The example architecture offers many advantages. Firstly, being based on a BNN, it represents a non-linear, fully probabilistic method which is highly compatible with e.g. clinical decision making processes. Secondly, the model is able to learn which input features are important for prediction, thereby making it interpretable which is highly desirable, especially in the clinical domain.

More generally, according to one aspect disclosed herein there is provided a computer-implemented method of operating a neural network, wherein the neural network comprises a plurality of layers, the plurality of layers comprising: i) an input layer comprising a plurality of input nodes each configured to receive a respective one of a plurality of input elements, ii) one or more hidden layers each comprising a plurality of hidden nodes, each hidden node configured to receive sets of input parameters where each set describes an input probability distribution from one of the nodes in a previous layer of the network, and to output a set of output parameters describing an output probability distribution to a next layer of the network, and iii) an output layer comprising one or more output nodes each configured to output a respective output element, wherein the one or more hidden layers connect the input layer to the output layer; and wherein the method comprises: at each of the input nodes, weighting the respective one of the plurality of input elements received by that input node by applying an instance of a first class of probability distribution to that input element, thereby generating a respective set of output parameters describing an output probability distribution; and from each of the input nodes, outputting the respective set of output parameters as input parameters to one or more nodes in a next, hidden layer of the network, and thereby propagating the respective set of output parameters through the one or more hidden layers to the output layer; said propagating comprising, at each of one or more nodes of at least one of the hidden layers, combining the sets of input parameters and weighting the combination by applying an instance of a second class of probability distribution to that combined set of input parameters, thereby generating a respective set of output parameters describing an output probability distribution for outputting to a next layer of the network, and wherein the first class of probability distribution is more sparsity inducing than the second class of probability distribution.

In embodiments, said propagating may comprise, at each node of the at least one hidden layer, combining the sets of input parameters and weighting the combination by applying an instance of the second class of probability distribution to that combination of input parameters.

In embodiments, the one or more hidden layers may comprise a plurality of hidden layers, and wherein said propagating comprises, at least one node of some or all of the hidden layers, combining the sets of input parameters and weighting the combination by applying an instance of the second class of probability distribution to that combination of input parameters.

In embodiments, the first class of probability distribution may only be applied by the nodes of the input layer, and wherein each node of the plurality of hidden layers applies an instance of the second class of probability.

In embodiments, each node that applies the first class of probability distribution may apply a same form of the first class of probability distribution.

In embodiments, some or each of the nodes that apply the first class of probability distribution may apply a different form of the first class of probability distribution.

In embodiments, each node that applies the second class of probability distribution may apply the same form of the second class of probability distribution.

In embodiments, said instance of the first class of probability distribution may be parametrized by at least a centre point at zero, and wherein a probability density of that instance of the first class of probability distribution tends to infinity at the centre point.

In embodiments, the first class of probability distribution may comprise one or more of the following forms of distribution, each instance of the first class taking one of these forms: a horseshoe probability distribution, a spike-and-slab probability distribution, a Laplace distribution, and a t-distribution.

In embodiments, the second class of probability distribution may comprise one or more of the following forms of distribution, each instance of the second class taking one of these forms: a Gaussian distribution, and a uniform distribution.

In embodiments, each form of the first and/or second classes of probability distributions may be parameterized by a respective set of parameters, and wherein the respective set of parameters comprise a centre point and/or a width of the probability distribution.

In embodiments, said operating may comprise at least operating the neural network in a training phase, and wherein the method may comprise: at each of the input nodes, receiving the respective one of the plurality of input elements, wherein each input element corresponds to a different input element of a training dataset; receiving a set of known output elements, each known output elements corresponding to a different output element of the training dataset; and training the neural network to predict the set of known output elements based on the received input elements, wherein said training comprises: an initial cycle of said weighting at each of the input nodes and said propagating, thereby outputting, by the one or more output nodes, an initial estimated set of output element; and one or more further cycles of said weighting at each of the input nodes and said propagating, thereby outputting, by the one or more output nodes, an updated estimated set of output elements, wherein for each further cycle, one or both of the weighting of the plurality of input elements and the weighting of the combined set of input parameters are adjusted to generate the updated estimated set of output elements until the updated estimated set of output elements differs from the set of known output elements by less than a threshold.

In embodiments, said operating may comprise at least operating the neural network in a prediction phase, and wherein the method may comprise: at each of the input nodes, receiving the respective one of the plurality of input elements, wherein each input element corresponds to a different input element of a prediction dataset; one or more cycles of said weighting at each of the input nodes and said propagating, wherein the neural network is trained to predict, after the one or more cycles, one or more predicted output elements based on the plurality of input elements; and at each of the output nodes, outputting a respective predicted output element.

In embodiments, said outputting of the predicted output elements may comprise outputting the predicted output elements to a user.

In embodiments, the method may comprise outputting to a user the respective sets of output parameters generated by one or more of the input nodes.

In embodiments, at least one output parameter of each set of output parameters generated by one or more of the input nodes may be a centre point of the probability distribution, and said outputting of those output parameters may comprise outputting, for each set of output parameters, either a zero value or a non-zero value for the centre point of that probability distribution, wherein a zero value is output if the centre point is less than a threshold value, and wherein a non-zero value is output if the centre point is more than the threshold value.

In embodiments, at least one output parameter of each set of output parameters may be a width of the probability distribution, and said outputting of the respective sets of output parameters may comprise outputting, for each set of output parameters, the width of that probability distribution.

In embodiments, the method may comprise, after said weighting of the respective ones of the plurality of input elements, for any input element that results in the generation, at one of the input nodes, of a respective set of output parameters comprising one or more parameters less than a threshold value, preventing that input element from propagating through the one or more hidden layers to the output layer.

In embodiments, for each of the plurality of layers other than the output layer, each node in a given layer is connected to each node in a next one of the layers (i.e. the adjacent following layer).

Each distribution of either class may be represented on a graph having a vertical axis defining a probability density and a horizontal axis defining a variable, with the centre point of the distribution being of the variable. Either class may take the form of a symmetrical distribution. For symmetrical distributions, the centre point of the distribution corresponds to the mean value of the variable.

In embodiments, the neural network is a Bayesian neural network.

Each node may apply either a first or second class of probability distribution. The first class of probability distribution is a sparsity inducing distribution. The second class of probability distribution is not a sparsity inducing distribution, or induces less sparsity than the first class of probability distribution. There may be one or more forms of each class of probability distribution. E.g. one form of the first class is a horseshoe, another form of the first class is a spike-and-slab. One form of the second class is a Gaussian. Each class of distribution is parameterised by a set of parameters. Each form of each class of distribution may be parameterised by the same set of parameters or a different set of parameters. The distributions applied by each node may be parameterised by different values of the respective sets of parameters, e.g. the values may be adjusted during training of the neural network.

In embodiments, some or each of the nodes that apply the second class of probability distribution applies a different form of the second class of probability distribution.

In embodiments, the one or more hidden layers may comprise a plurality of hidden layers, and wherein said propagating comprises: at each node of one, some or all of a first set of the hidden layers, combining the sets of input parameters and weighting the combination by applying an instance of the first class of probability distribution to that combination of input parameters; and at each node of one, some or all of a second, different set of the hidden layers, combining the sets of input parameters and weighting the combination by applying an instance of the second class of probability distribution to that combination of input parameters.

In embodiments, the first set of hidden layers may comprise a hidden layer directly connected to the input layer.

In embodiments, the centre point may be the mean of the distribution and the width may be the variance or standard deviation of the distribution.

In embodiments, the threshold may be a separate threshold for each output element, e.g. each known and estimated output element must differ by less than a threshold, which may be the same of different. Alternatively, the threshold may an overall threshold, e.g. the differences between each of the known and estimated output elements must sum to be less than a threshold.

In embodiments, each centre point that has a centre point value which is less than a threshold value may be classified as a zero value.

According to another aspect disclosed herein there is provided computing apparatus comprising one or more processors and storage storing code arranged to run on the one or more processors, wherein the code is configured so as when run to perform operations of operating a neural network, wherein the neural network comprises a plurality of layers, the plurality of layers comprising: i) an input layer comprising a plurality of input nodes each configured to receive a respective one of a plurality of input elements, ii) one or more hidden layers each comprising a plurality of hidden nodes, each hidden node configured to receive sets of input parameters where each set describes an input probability distribution from one of the nodes in a previous layer of the network, and to output a set of output parameters describing an output probability distribution to a next layer of the network, and iii) an output layer comprising one or more output nodes each configured to output a respective output element, wherein the one or more hidden layers connect the input layer to the output layer; and wherein said operations comprise: at each of the input nodes, weighting the respective one of the plurality of input elements received by that input node by applying an instance of a first class of probability distribution to that input element, thereby generating a respective set of output parameters describing an output probability distribution; and from each of the input nodes, outputting the respective set of output parameters as input parameters to one or more nodes in a next, hidden layer of the network, and thereby propagating the respective set of output parameters through the one or more hidden layers to the output layer; said propagating comprising, at each of one or more nodes of at least one of the hidden layers, combining the sets of input parameters and weighting the combination by applying an instance of a second class of probability distribution to that combined set of input parameters, thereby generating a respective set of output parameters describing an output probability distribution for outputting to a next layer of the network, and wherein the first class of probability distribution is more sparsity inducing than the second class of probability distribution.

According to another aspect disclosed herein there is provided a computer program embodied on computer-readable storage and configured so as when run one or more processors to perform operations of operating a neural network, wherein the neural network comprises a plurality of layers, the plurality of layers comprising: i) an input layer comprising a plurality of input nodes each configured to receive a respective one of a plurality of input elements, ii) one or more hidden layers each comprising a plurality of hidden nodes, each hidden node configured to receive sets of input parameters where each set describes an input probability distribution from one of the nodes in a previous layer of the network, and to output a set of output parameters describing an output probability distribution to a next layer of the network, and iii) an output layer comprising one or more output nodes each configured to output a respective output element, wherein the one or more hidden layers connect the input layer to the output layer; and wherein said operations comprise: at each of the input nodes, weighting the respective one of the plurality of input elements received by that input node by applying an instance of a first class of probability distribution to that input element, thereby generating a respective set of output parameters describing an output probability distribution; and from each of the input nodes, outputting the respective set of output parameters as input parameters to one or more nodes in a next, hidden layer of the network, and thereby propagating the respective set of output parameters through the one or more hidden layers to the output layer; said propagating comprising, at each of one or more nodes of at least one of the hidden layers, combining the sets of input parameters and weighting the combination by applying an instance of a second class of probability distribution to that combined set of input parameters, thereby generating a respective set of output parameters describing an output probability distribution for outputting to a next layer of the network, and wherein the first class of probability distribution is more sparsity inducing than the second class of probability distribution.

Other variants or applications may become apparent to a person skilled in the art once given the disclosure herein. The scope of the disclosure is not limited by the above-described embodiments but only by the accompanying claims.

The invention claimed is:

1. A computer-implemented method of operating a neural network, wherein the neural network comprises a plurality of layers, the plurality of layers comprising: i) an input layer comprising a first input node and a second input node each configured to receive at least one input element, ii) a hidden layer comprising a hidden node, and iii) an output layer; and wherein the method comprises:

receiving the at least one input element from a training dataset;

receiving at least one known output element, each of the at least one known output element corresponding to a different input element of the training dataset; and training the neural network to predict the at least one known output element based on the at least one input element, wherein training the neural network comprises:

at the first input node of the input layer, applying a first instance of a first class of probability distribution, wherein the first instance is a horseshoe probability distribution, thereby generating a first output parameter, at the second input node of the input layer, applying a second instance of the first class of probability distribution, wherein the second instance is a t-distribution, wherein the first instance and the second instance are different forms of the first class of probability distribution, and wherein the first class of probability distribution induces more sparsity amongst distribution parameters generated at the first input node compared to distribution parameters generated by application of a second class of probability distribution at the hidden node of the hidden layer, and propagating the first output parameter through the hidden layer to the output layer, said propagating comprising, at the hidden node of the hidden layer, applying an instance of the second class of probability distribution, thereby generating a second output parameter for outputting to the output layer of the neural network.

2. The method of claim 1, wherein the hidden layer comprises a plurality of hidden layers, each of the first input node and the second input node outputting at least one output parameter to at least one hidden node of the plurality of hidden layers.

3. The method of claim 2, wherein said propagating comprises, at the at least one hidden node of the hidden layer, combining the first output parameter and the second output parameter to obtain a combination of output parameters and weighting the combination by applying the instance of the second class of probability distribution to the combination of output parameters.

4. The method of claim 3, wherein each hidden node of the plurality of hidden layers applies the second class of probability distribution.

5. The method of claim 4, wherein each hidden node of the plurality of hidden layers applies a same form of the second class of probability distribution.

6. The method of claim 1, wherein the first instance of the first class of probability distribution is parameterized by at least a centre point at zero, and wherein a probability density of the first instance of the first class of probability distribution tends to infinity at the centre point.

7. The method of claim 1, wherein the hidden node of the hidden layer applies a Gaussian distribution or a uniform distribution.

8. The method of claim 1, wherein said training comprises:

an initial cycle of weighting at the first input node of the input layer and said propagating, thereby outputting, by an output node, an initial estimated output element; and one or more further cycles of said weighting at the first input node of the input layer and said propagating, thereby outputting, by the output node, an updated estimated output element, wherein for each further cycle, the weighting of the at least one input element is adjusted to generate the updated estimated output element until the updated estimated output element differs from the at least one known output element by less than a threshold.

9. The method of claim 8, comprising:

after said weighting of the at least one input element preventing a given input element from propagating through the hidden layer to the output layer when a given output parameter corresponding to the given input element is less than a threshold value.

10. The method of claim 9, wherein the hidden node of the hidden layer applies a Gaussian distribution.

11. The method of claim 9, wherein the hidden node of the hidden layer applies a uniform distribution.

12. The method of claim 1, wherein the neural network is trained to predict a predicted output element based on a given input element.

13. The method of claim 12, further comprising outputting of the predicted output element by displaying the predicted output element to a user.

14. The method of claim 1, comprising displaying to a user a given input element and a given output parameter indicating a relevance of the given input element.

15. The method of claim 14, wherein the given output parameter is a centre point of the first instance of the first class of probability distribution, and said outputting of the given output parameter comprises outputting either a zero value or a non-zero value for the centre point of the first instance of the first class of probability distribution, wherein the zero value is output if the centre point is less than a threshold value, and wherein the non-zero value is output if the centre point is more than the threshold value.

16. The method of claim 14, wherein the first output parameter represents a width of the first instance of the first class of probability distribution.

17. The method of claim 1, wherein a third input node applies a Laplace distribution.

18. The method of claim 1, wherein a third input node applies a spike-and-slab probability distribution.

19. A computing apparatus comprising a processor and storage storing code arranged to run on the processor, wherein the code is configured to perform operations of operating a neural network, wherein the neural network comprises a plurality of layers, the plurality of layers comprising: i) an input layer comprising a first input node and a second input node each configured to receive at least one input element, ii) a hidden layer comprising a hidden node, and iii) an output layer; and wherein said operations comprises:

at the first input node, receiving the at least one input element from a training dataset;

receiving at least one known output element, each of the at least one known output element corresponding to a different input element of the training dataset; and training the neural network to predict the at least one known output element based on the at least one input element, wherein training the neural network comprise:

at the first input node of the input layer, applying a first instance of a first class of probability distribution, wherein the first instance is a horseshoe probability distribution, thereby generating a first output parameter, at the second input node of the input layer, applying a second instance of the first class of probability distribution, wherein the second instance is a t-distribution, wherein the first instance and the second instance are different forms of the first class of probability distribution, and wherein the first class of probability distribution induces more sparsity amongst distribution parameters generated at the first input node compared to distribution parameters generated by application of a second class of probability distribution at the hidden node of the hidden layer; and propagating the first output parameter through the hidden layer to the output layer, said propagating comprising, at the hidden node of the hidden layer, applying an instance of the second class of probability distribution, thereby generating a second output parameter for outputting to the output layer of the neural network.

20. A computer program embodied on a non-transitory computer-readable storage and configured so as when run a processor to perform operations of operating a neural network, wherein the neural network comprises a plurality of layers, the plurality of layers comprising: i) an input layer comprising a first input node and a second input node each configured to receive at least one input element, ii) a hidden layer comprising a hidden node, and iii) an output layer; and wherein said operations comprise:

at the first input node, receiving the at least one input element from a training dataset;

receiving at least one known output element, each of the at least one known output element corresponding to a different input element of the training dataset; and training the neural network to predict the at least one known output element based on the at least one input element, wherein training the neural network comprises:

at the first input node of the input layer, applying a first instance of a first class of probability distribution, wherein the first instance is a horseshoe probability distribution, thereby generating a first output parameter, at the second input node of the input layer, applying a second instance of the first class of probability distribution, wherein the second instance is a t-distribution wherein the first instance and the second instance are different forms of the first class of probability distribution, and wherein the first class of probability distribution induces more sparsity amongst distribution parameters generated at the first input node compared to distribution parameters generated by application of a second class of probability distribution at the hidden node of the hidden layer; and propagating the first output parameter through the hidden layer to the output layer, said propagating comprising, at the hidden node of the hidden layer, applying an instance of the second class of probability distribution, thereby generating a second output parameter for outputting to the output layer of the neural network.

* * * * *